(12) United States Patent
Eriksen et al.

(10) Patent No.: US 10,227,891 B2
(45) Date of Patent: Mar. 12, 2019

(54) GAS TURBINE ENGINE WASH SYSTEM

(71) Applicant: General Electric Company, Schenectady, NY (US)

(72) Inventors: Michael Edward Eriksen, Cincinnati, OH (US); Keith Anthony Lauria, Wells, NY (US); Ambarish Jayant Kulkarni, Glenville, NY (US); Byron Andrew Pritchard, Jr., Loveland, OH (US); David Geoffrey Dauenhauer, Cincinnati, OH (US); Bernard Patrick Bewlay, Niskayuna, NY (US); Nicole Jessica Tibbetts, Delanson, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/472,456

(22) Filed: Mar. 29, 2017

(65) Prior Publication Data

US 2018/0283209 A1 Oct. 4, 2018

(51) Int. Cl.
*B08B 9/00* (2006.01)
*F01D 25/00* (2006.01)
*B08B 3/00* (2006.01)

(52) U.S. Cl.
CPC ............ *F01D 25/002* (2013.01); *B08B 3/003* (2013.01); *B08B 9/00* (2013.01); *F05D 2220/32* (2013.01)

(58) Field of Classification Search
None
See application file for complete search history.

(56) References Cited

U.S. PATENT DOCUMENTS

| 4,059,123 | A | 11/1977 | Bartos et al. |
| 5,597,950 | A * | 1/1997 | Mullen ................. G01F 23/241 |
| | | | 73/53.01 |
| 5,704,991 | A * | 1/1998 | Marcus .................. C11D 3/225 |
| | | | 134/26 |
| 5,970,574 | A | 10/1999 | Thrash, Jr. |
| D422,055 | S | 3/2000 | Stasney et al. |

(Continued)

FOREIGN PATENT DOCUMENTS

| JP | 2007063998 A | 3/2007 |
| WO | WO2015051146 A1 | 4/2015 |

OTHER PUBLICATIONS

U.S. Appl. No. 14/967,043, filed Dec. 11, 2015.
(Continued)

*Primary Examiner* — Mikhail Kornakov
*Assistant Examiner* — Ryan L. Coleman
(74) *Attorney, Agent, or Firm* — General Electric Company; Kristi Davidson

(57) ABSTRACT

A wash system for a gas turbine engine includes a foam generating device configured for receiving and aerating a flow of wash fluid to generate a flow of foamed wash fluid having particular foam characteristics. The flow of foamed wash fluid passes through a distribution manifold where it is selectively directed through a plurality of wash lines to desired portions of the gas turbine engine. The wash system further includes a controller configured for manipulating the foam characteristics of the flow of foamed wash fluid and using the distribution manifold to selectively direct the flow of foamed wash fluid to desired portions of the gas turbine engine for optimal cleaning and improved engine efficiency.

15 Claims, 11 Drawing Sheets

(56) References Cited

U.S. PATENT DOCUMENTS

| | | | |
|---|---|---|---|
| 6,118,000 | A | 9/2000 | Frenier |
| 6,311,704 | B1 | 11/2001 | Foster |
| 6,478,033 | B1 | 11/2002 | Foster |
| 6,491,048 | B1 | 12/2002 | Foster |
| 6,503,334 | B2 | 1/2003 | Ruiz et al. |
| 6,521,028 | B1 | 2/2003 | Frenier |
| 6,883,527 | B2 | 4/2005 | Travaly et al. |
| 7,494,073 | B2 | 2/2009 | Pivovarov |
| 7,531,048 | B2 | 5/2009 | Woodcock et al. |
| 8,057,607 | B2 | 11/2011 | Gardner et al. |
| 8,308,869 | B2 | 11/2012 | Gardner et al. |
| 8,479,754 | B2 | 7/2013 | Hjerpe |
| 8,524,011 | B2 | 9/2013 | Gardner et al. |
| 8,628,627 | B2 | 1/2014 | Sales et al. |
| 8,728,246 | B2 | 5/2014 | Varrin, Jr. et al. |
| 8,747,566 | B2 | 6/2014 | Rice et al. |
| 8,763,855 | B1 | 7/2014 | Harvey et al. |
| 8,871,090 | B2 | 10/2014 | Livshits et al. |
| 8,919,391 | B1 | 12/2014 | Harvey et al. |
| 9,074,830 | B2 | 7/2015 | Moll et al. |
| 9,452,848 | B2 | 9/2016 | McDermott |
| 2006/0219269 | A1 | 10/2006 | Rice et al. |
| 2006/0231644 | A1* | 10/2006 | Breedlove ............... A62C 25/00 239/398 |
| 2007/0028947 | A1 | 2/2007 | Erickson et al. |
| 2010/0116292 | A1 | 5/2010 | Wagner |
| 2010/0154844 | A1* | 6/2010 | Duterme ................... B60S 3/04 134/123 |
| 2014/0034091 | A1 | 2/2014 | Dorshimer et al. |
| 2014/0083466 | A1 | 3/2014 | Sales, Jr. et al. |
| 2014/0144473 | A1 | 5/2014 | Martin |
| 2015/0083169 | A1 | 3/2015 | Hjerpe |
| 2015/0122292 | A1 | 5/2015 | McDermott |
| 2015/0285094 | A1 | 10/2015 | Tibbetts et al. |
| 2016/0160679 | A1 | 6/2016 | Griffiths et al. |
| 2016/0186602 | A1 | 6/2016 | Saenz |
| 2016/0230592 | A1* | 8/2016 | Saenz ................... F01D 25/002 |

OTHER PUBLICATIONS

On-wing Washing System Using Injected Water or Detergent Which Penetrates Deep Into the Engine, Cleaning Performance Stealing Contaminants, Aero Jet Wash, LLC. http://www.aerojetwash.com/services.html.

Engine Washing, Aviation Today, Oct. 1, 2006, 3 pages.

PCT/CN2016/102127 application filed by General Electric Company on Oct. 14, 2016.

PCT/CN2016/102138 application filed by General Electric Company on Oct. 14, 2016.

International Search Report and Written Opinion issued in connection with corresponding PCT Application No. PCT/US2018/018467 dated May 29, 2018.

* cited by examiner

GAS TURBINE ENGINE WASH SYSTEM

FIELD

The present subject matter relates generally to a wash system for a gas turbine engine, and a method for operating the same.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustor section, a turbine section, and an exhaust section. In operation, air is provided from the fan to an inlet of the compressor section where one or more axial compressors progressively compress the air until it reaches the combustor section. Fuel is mixed with the compressed air and burned within the combustor section to provide combustion gases. The combustion gases are routed from the combustor section to the turbine section. The flow of combustion gasses through the turbine section drives the turbine section and is then routed through the exhaust section, e.g., to atmosphere.

During operation, a substantial amount of air is ingested by such gas turbine engines. However, such air may contain foreign particles. A majority of the foreign particles will follow a gas path through the engine and exit with the exhaust gases. However, at least certain of these particles may stick to certain components within the gas turbine engine's gas path, potentially changing aerodynamic properties of the engine and reducing engine performance.

In order to remove such foreign particles from within the gas path of the gas turbine engine, water or other fluids may be directed towards an inlet of the gas turbine engine, while the core engine is cranked using, e.g., using a starter motor. However, such cleaning operations are often not tailored to the type of cleaning actually needed in a particular portion of the engine. For example, depending on the prior operating conditions of the gas turbine engine, a quick and simple water wash may be needed. In other situations, a long wash cycle with a wash foam having particular foam characteristics may be needed to properly clean engine and return it to peak efficiency.

Accordingly, a wash system for providing improved and customized cleaning of a gas turbine engine would be useful. More particularly, a wash system for providing heated and/or pressurized wash fluid having desired cleaning characteristics at desired locations within the gas turbine engine would be especially beneficial.

BRIEF DESCRIPTION

Aspects and advantages of the invention will be set forth in part in the following description, or may be obvious from the description, or may be learned through practice of the invention.

In one embodiment of the present disclosure, a modular foam cart for washing a gas turbine engine is provided. The modular foam cart includes a detergent reservoir for storing wash fluid, a pump configured for receiving a flow of wash fluid and pressurizing the flow of wash fluid, and a foam generating device in fluid communication with the pump, the foam generating device being configured for aerating the flow of wash fluid to generate a flow of foamed wash fluid. A distribution manifold is in fluid communication with the foam generating device, the distribution manifold being configured for selectively directing the flow of foamed wash fluid through a plurality of wash lines. A controller is in operative communication with the foam generating device, the controller being configured for manipulating one or more foam quality characteristics of the flow of foamed wash fluid based on one or more operating characteristics of the gas turbine engine.

In another exemplary embodiment of the present disclosure a method for cleaning a gas turbine engine using a modular foam cart is provided. The modular foam cart includes a foam generating device that generates a flow of foamed wash fluid and a distribution manifold for selectively directing the flow of wash fluid to a plurality of wash lines fluidly coupled to the gas turbine engine. The method includes determining one or more operating characteristics of the gas turbine engine, determining a set of wash cycle parameters based at least in part on the one or more operating characteristics of the gas turbine engine, and selectively providing the flow of foamed wash fluid to the distribution manifold and through the plurality of wash lines according to the determined set of wash cycle parameters.

According to still another embodiment of the present invention, a wash system for washing a gas turbine engine is provided. The gas turbine engine includes a compressor section, a combustor section, and a turbine section, the turbine engine defining a plurality of borescope holes located within one or more of the compressor section, the combustor section, and the turbine section. The gas turbine engine further includes one or more inlet nozzles positioned proximate an engine inlet. The wash system includes a detergent reservoir for storing wash fluid and a distribution manifold providing selective fluid communication between the detergent reservoir and a plurality of wash lines fluidly coupled to the plurality of borescope holes and the inlet nozzles. A pump is configured for urging a flow of wash fluid from the detergent reservoir through the distribution manifold and at least one of the plurality of wash lines. A controller is in operative communication with the distribution manifold. The controller is configured for determining one or more operating characteristics of the gas turbine engine, determining a set of wash cycle parameters based at least in part on the one or more operating characteristics of the gas turbine engine, and selectively providing the flow of wash fluid to the distribution manifold and through the plurality of wash lines according to the determined set of wash cycle parameters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
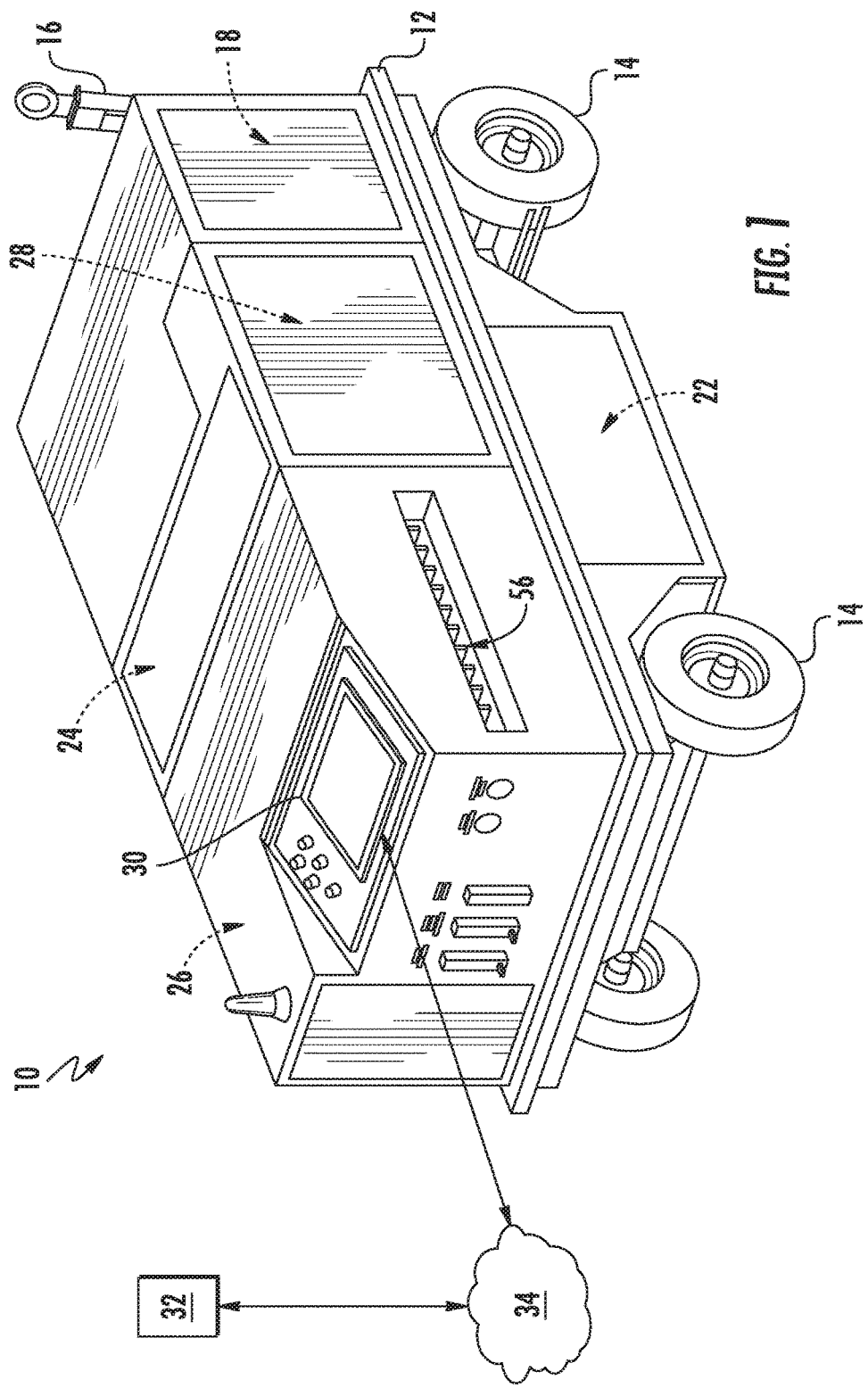
FIG. 1 is a perspective view of a modular foam cart that may contain certain components of an exemplary wash system according to exemplary embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 provides a modular foam cart 10 according to an exemplary embodiment of the present subject matter. As described in detail below, modular foam cart 10 may be configured for housing some or all components of a wash system 20 (which will be described in more detail below in reference to FIG. 2). Wash system 20 is generally configured for washing, rinsing, or otherwise cleaning a gas turbine engine, such as a turbofan gas turbine engine (e.g., turbofan 100; see FIG. 8). Additionally, or alternatively, however, the wash system 20 may be utilized with any other suitable gas turbine engine, such as a turboprop engine, a turboshaft engine, turbojet engine, etc.

According to the exemplary illustrated embodiment, wash system 20 is configured as a modular system that is housed at least in part on or within modular foam cart 10. As illustrated, modular foam cart includes a support frame 12 mounted on a plurality of wheels 14 to improve the mobility of the cart and facilitate quick and easy cleaning of turbofan 100. In addition, modular foam cart 10 may include a pivoting tug bar 16 such that modular foam cart 10 may be towed by a vehicle to a desired location proximate to turbofan 100. In addition, modular foam cart 10 can contain various storage compartments 18 for storing all equipment necessary for cleaning turbofan 100 and other features for facilitating the quick and easy cleaning of turbofan 100.

Figure 2:
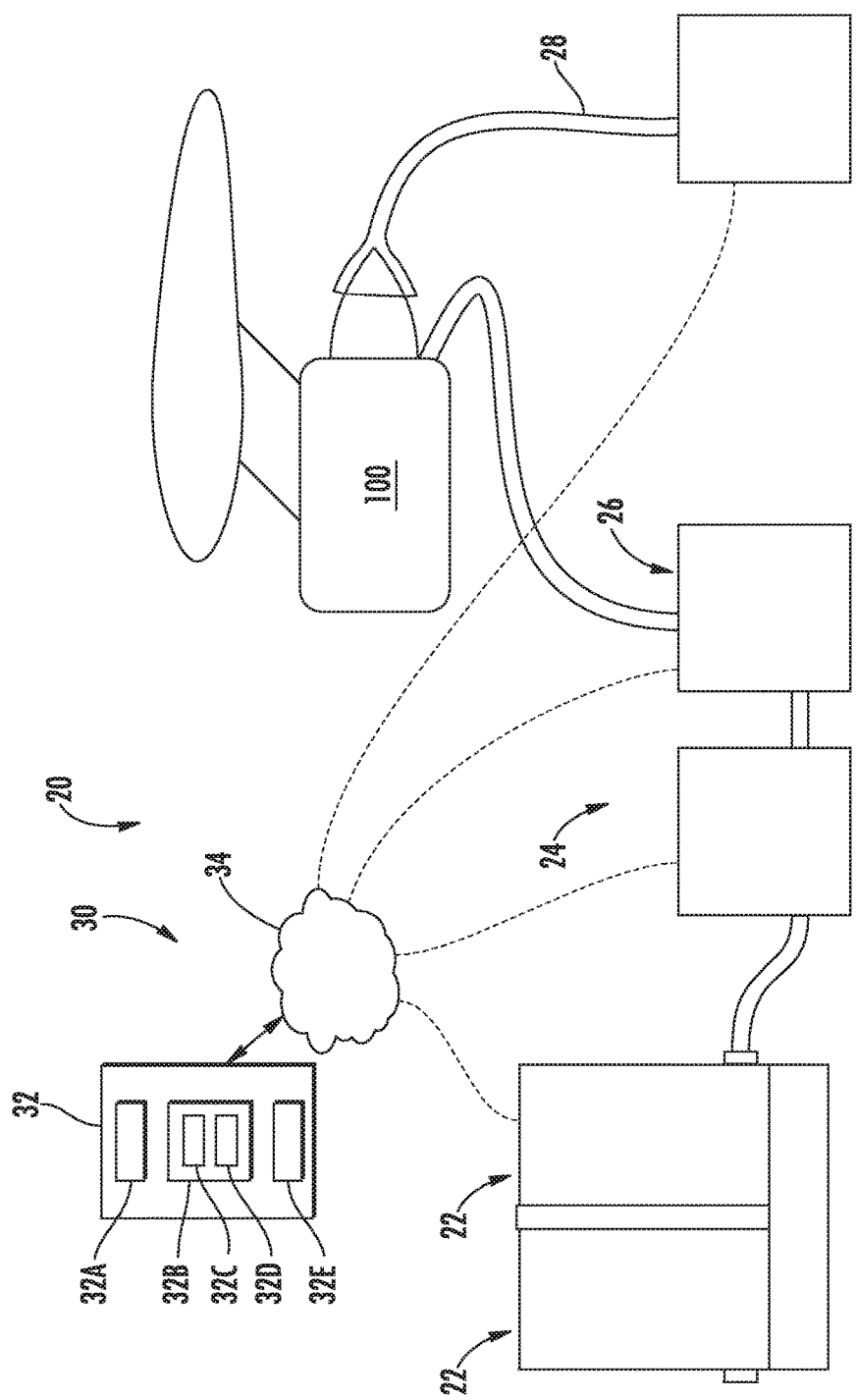
FIG. 2 is a schematic view of the exemplary wash system of FIG. 1 in accordance with an exemplary embodiment of the present disclosure.

Referring now to FIG. 2, wash system 20 in accordance with an exemplary embodiment of the present disclosure will be described. More specifically, FIG. 2 provides a schematic view of wash system 20 and its various cleaning modules in accordance with an exemplary embodiment of the present disclosure. For example, wash system 20 generally includes one or more tank modules 22 (see, e.g., FIGS. 3 and 4), a wash module 24 (see, e.g., FIGS. 5 and 6), a foam wash module 26, and a collection module 28 (see, e.g., FIGS. 9 and 10). In general, as will be described in detail below, tank modules 22 store wash fluid, wash module 24 receives and pressurizes the wash fluid, foam wash module 26 processes the wash liquid to form wash foam, and collection module 28 collects and/or recycles waste wash fluid.

Each of the various modules are, for the embodiment depicted, operably connected to a control system 30. The control system 30 may include one or more computing device(s) 32. The computing device(s) 32 may include one or more processor(s) 32A and one or more memory device(s) 32B. The one or more processor(s) 32A may include any suitable processing device, such as a microprocessor, microcontroller, integrated circuit, logic device, or other suitable processing device. The one or more memory device(s) 32B may include one or more computer-readable media, including, but not limited to, non-transitory computer-readable media, RAM, ROM, hard drives, flash drives, or other memory devices.

The one or more memory device(s) 32B may store information accessible by the one or more processor(s) 32A, including computer-readable instructions 32C that can be executed by the one or more processor(s) 32A. The instructions 32C can be any set of instructions that when executed by the one or more processor(s) 32A, cause the one or more processor(s) 32A to perform operations. The instructions 32C may be software written in any suitable programming language or can be implemented in hardware. In some embodiments, the instructions 32C may be executed by the one or more processor(s) 32A to cause the one or more processor(s) 32A to perform operations, such as the washing operations of a gas turbine engine, as described herein, and/or any other operations or functions of the one or more computing device(s) 32. Additionally, and/or alternatively, the instructions 32C may be executed in logically and/or virtually separate threads on processor 32A. The memory device(s) 32B can further store data 32D that can be accessed by the processors 32A.

The computing device(s) 32 can also include a communications interface 32E used to communicate, for example, with the other components of wash system 20. The communications interface 32E may include any suitable components for interfacing with one more communications network(s), including for example, transmitters, receivers, ports, controllers, antennas, or other suitable components. Control system 30 may also be communication (e.g., via communications interface 32E) with the various modules 22, 24, 26, 28, described below, and may selectively operate the wash system 20 in response to user input and feedback from these modules 22, 24, 26, 28. More specifically, for the embodiment depicted, the control system 30 is configured to communicate through a wireless communication network 34 through communications interface 32E, such that the control system 30 may send or receive information and/or commands to or from the various modules 22, 24, 26, 28 of the exemplary wash system 20 wirelessly. It should be appreciated, however, that in other embodiments, the control system 30 may additionally, or alternatively, use a wired communication bus to communicate with various modules 22, 24, 26, 28.

The technology discussed herein makes reference to computer-based systems and actions taken by and information sent to and from computer-based systems. It should be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel. For example, although the exemplary control system 30 is depicted as including a separate computing device 32, in certain embodiments, the computing device 32 may be included within, e.g., one or more of the modules 22, 24, 26, 28, an onboard computing device of an aircraft, a controller of a gas turbine engine, etc.

It should be appreciated that modular foam cart 10 and wash system 20 as described herein may allow for a more versatile cleaning system for a gas turbine engine, such as turbofan 100. For example, utilizing tank modules that are interchangeable with a wash module and/or a foam wash module may allow for extended washing operations, without having to refill a wash tank and wait for the wash liquid in such wash tank to heat up to a desired temperature. Instead, once all of a wash liquid within a given tank module has been utilized by the wash system, a second tank module may be fluidly connected to the wash module to allow for the washing operations to continue with minimal interruption. Similarly, utilizing a wash module that is interchangeable with, e.g. a foam wash module may allow for multiple wash operations to be completed on a given gas turbine engine without requiring two completely separate wash systems. In addition, according to exemplary embodiments of the present subject matter, a power module could be configured for providing compressed air and/or electrical power, e.g., when wash system 20 is used in a location where such facilities are inconvenient or unavailable.

Additionally, as stated, the exemplary wash system may be controlled through a control system in communications with a wireless network. Accordingly, the control system may be operably connected to the various modules through a wireless communication network, and further, may receive control signals/commands through a wireless communication network. Such a configuration may allow for an operator located remotely from the wash system, such as an operator within a cockpit of an aircraft, to wirelessly control certain aspects of the wash system.

It should be appreciated, that as used herein the term "fluid," "wash fluid," "wash liquid," and the like may refer to any suitable fluid for performing washing operations and/or rinsing the gas turbine engine. Such wash fluid is typically made up of water that may include other additives such as detergent or other treatments. For example, the wash fluid may refer to water, or a combination of water and detergent, soap, and/or other additives. Moreover, wash system 20 is not limited to utilizing water or any particular detergent as a wash fluid. Instead, wash system 20 may utilize any suitable wash liquid for performing desired washing operations of the gas turbine engine.

Figure 3:
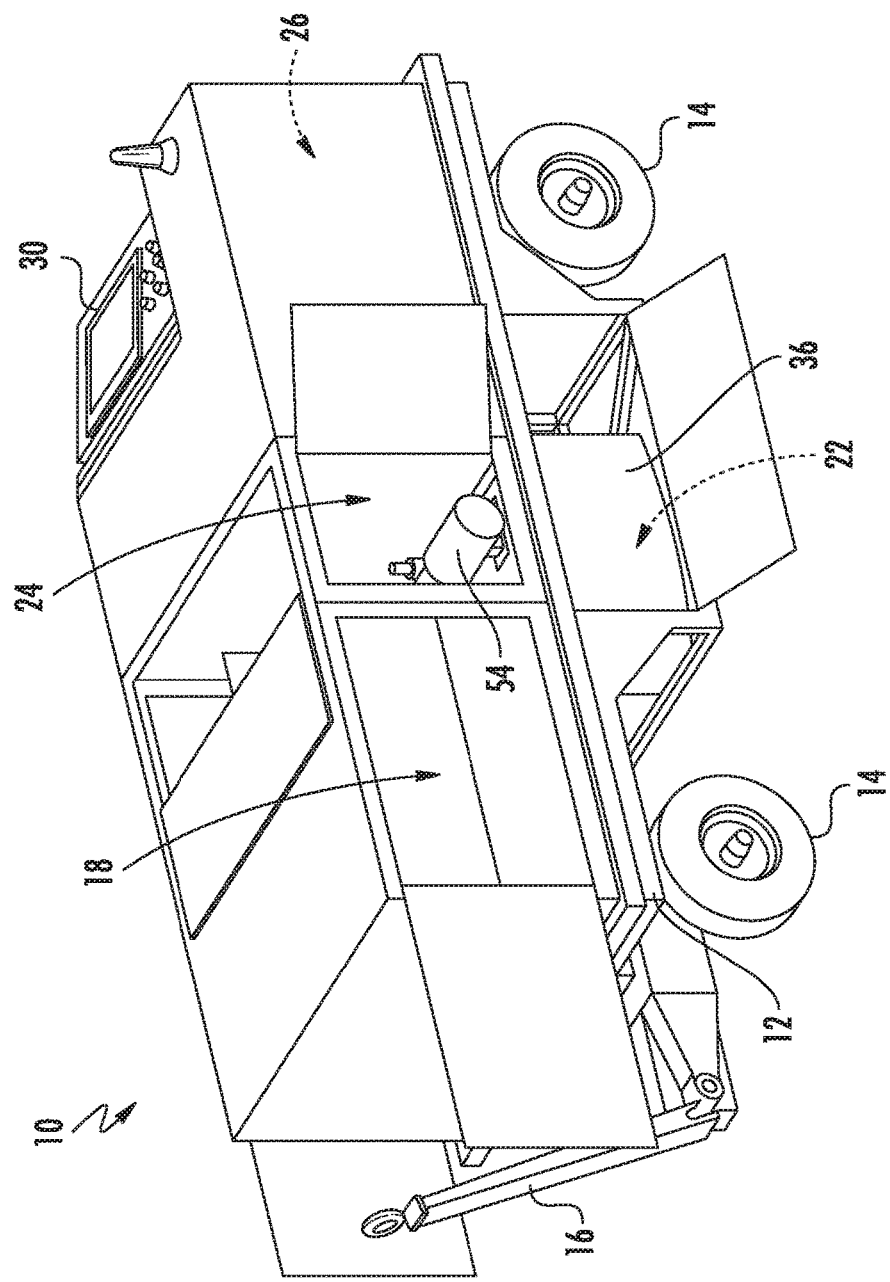
FIG. 3 provides another perspective view of the exemplary cart of FIG. 1 with several doors of the cart opened to reveal interior components.
Figure 4:
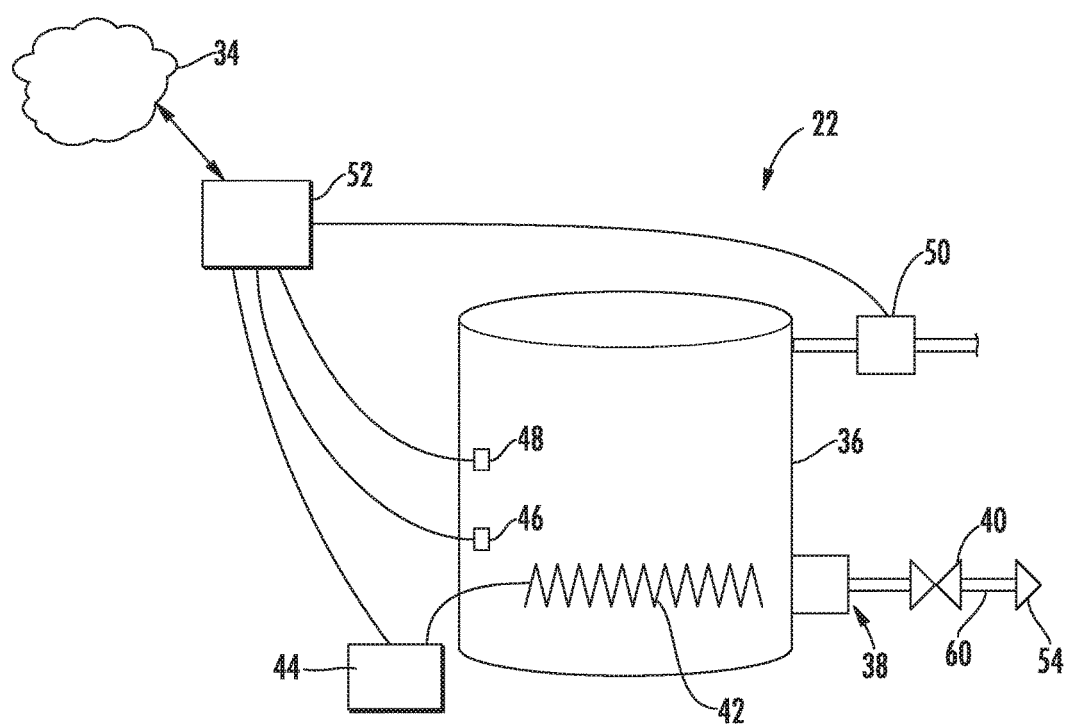
FIG. 4 is a schematic view of a tank module in accordance with an exemplary embodiment of the present disclosure, as may be incorporated in the exemplary wash system of FIG. 1.

Referring now particularly to FIGS. 3 and 4, tank module 22 will be described according to an exemplary embodiment of the present subject matter. More specifically, FIG. 3 provides a perspective view of tank module 22 as it may be contained within modular foam cart 10 according to an exemplary embodiment of the present subject matter. FIG. 4 provides a schematic view of tank module 22 in accordance with an exemplary aspect of the present disclosure. The exemplary tank module 22 may be utilized with the exemplary wash system 20 described above with reference to FIG. 1 or within any other suitable wash system.

As is depicted the exemplary tank module 22 includes a detergent reservoir such as a wash tank 36 for containing a wash fluid, or rather a wash liquid. The wash tank 36 further defines an outlet 38. The outlet 38 of the wash tank 36 is fluidly connected to a quick release connection 40, allowing for the wash tank 36 to be quickly, easily, and reversibly fluidly connected to, e.g., a wash module 24 or a foam wash module 26 of a wash system 20.

Moreover, the exemplary tank module 22 includes a heater 42 in thermal communication with the wash liquid within the wash tank 36. The heater 42 for the embodiment depicted is an electric resistance heater electrically connected to a power source 44. The power source 44 may be a battery, or any other suitable power source 44. It should be appreciated, however, that in other embodiments, the heater 42 may be configured in any other suitable manner (i.e., as any other suitable kind of heater) for heating the wash liquid within the wash tank 36. For example, according to another embodiment, tank module 22 may include an in-line heater that provides on-demand heating of a fluid passing through the heater. Such on-demand heating reduces the preparation time required for conventional wash operations compared to systems that require preheating of the wash fluid, e.g., within a heated storage tank.

The tank module 22 further includes one or more sensors. The sensors may include a temperature sensor 46 for sensing a temperature of the wash liquid within the wash tank 36, a water level sensor 48, and a pressure sensor 49. Additionally, for the embodiment depicted, the tank module 22 includes a pump 50 for pumping wash liquid into the wash tank 36 when connected with a liquid source (such as a hose, faucet, or a liquid storage container). The tank module 22 further includes a controller 52 operably connected to the power source 44 and heater 42, the sensors 46, 48, 49 and the pump 50. The controller 52 may configured similar to the computing device 32 of the control system 30, and may be in communication with the control system 30 of the wash system 20 through, e.g., a wireless communication network 34.

It should be appreciated, however, that the exemplary tank module 22 depicted is provided by way of example only, and that in other exemplary embodiments, the tank module 22 may be configured in any other suitable manner. For example, in other embodiments, the tank module 22 may include features not described herein, or alternatively, may not include one or more of the features described herein.

Figure 5:
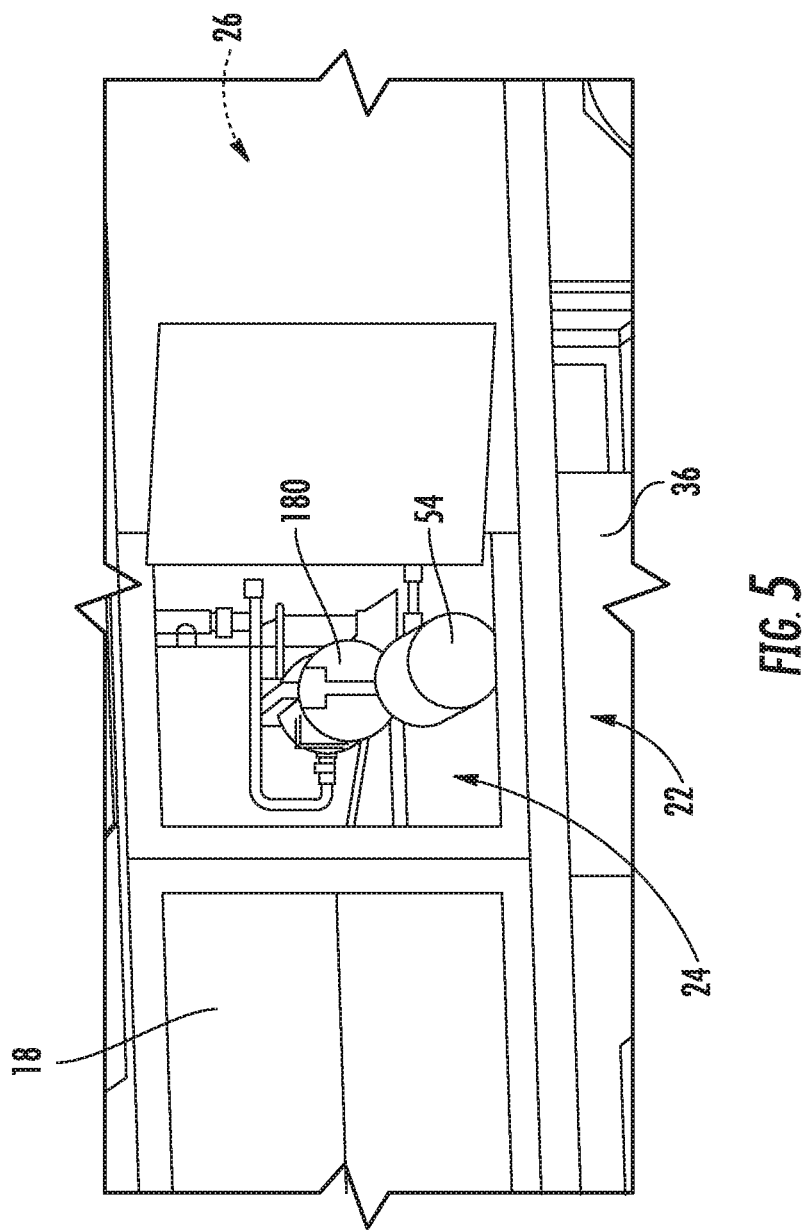
FIG. 5 provides a close up perspective view of a pump compartment of the exemplary cart of FIG. 1.
Figure 6:
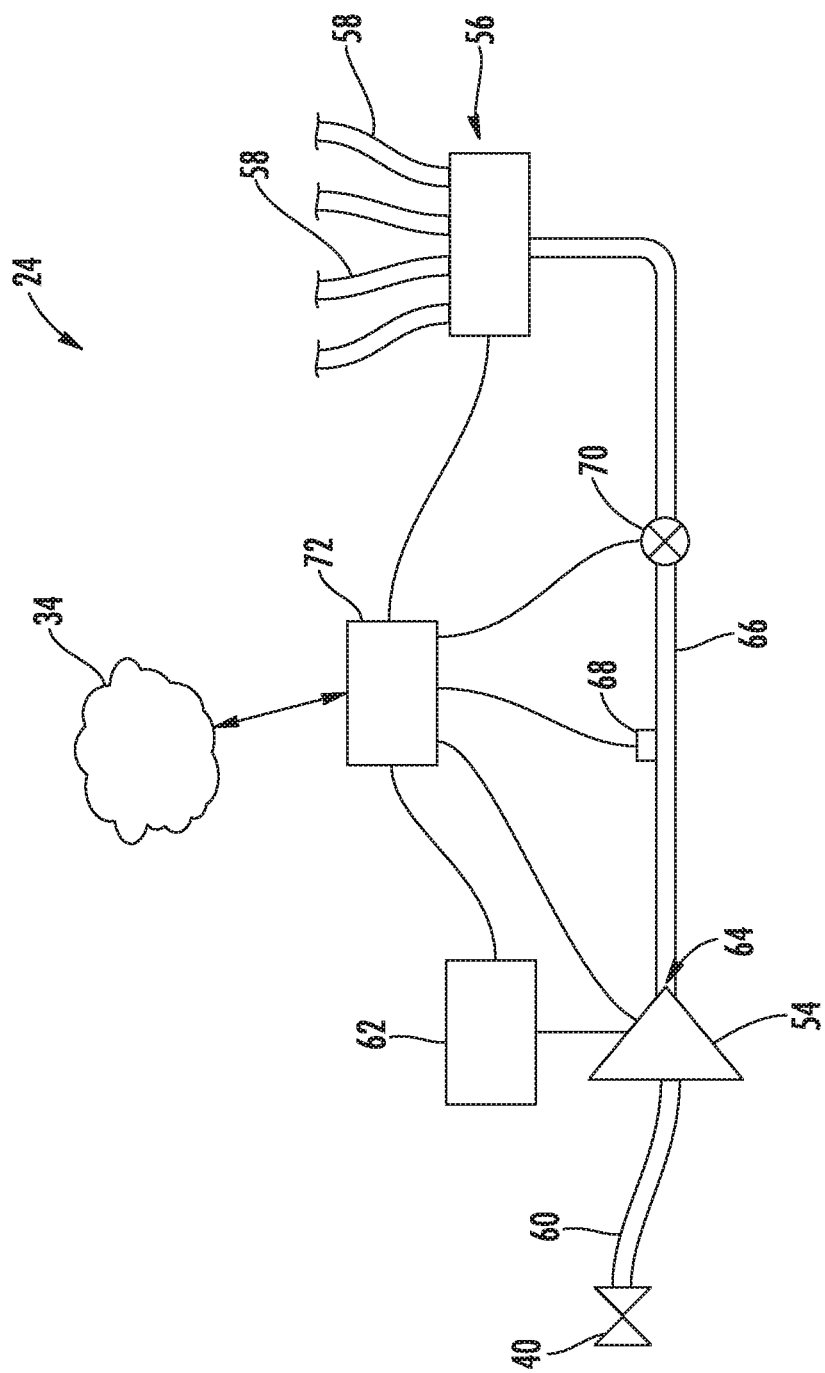
FIG. 6 is a schematic view of a wash module in accordance with an exemplary embodiment of the present disclosure, as may be incorporated in the exemplary wash system of FIG. 1.

Referring now particularly to FIGS. 5 and 6, wash module 24 will be described according to an exemplary embodiment of the present subject matter. More specifically, FIG. 5 provides a perspective view of wash module 24 as it may be contained within modular foam cart 10 according to an exemplary embodiment of the present subject matter. FIG. 6 provides a schematic view of the wash module 24 in accordance with an exemplary aspect of the present disclosure. The exemplary wash module 24 of FIGS. 5 and 6 may, in certain exemplary embodiments, be utilized with the exemplary wash system 20 described above with reference to FIG. 1. However, it should be appreciated, that in other embodiments the wash module 24 described with reference to FIGS. 5 and 6 may instead be utilized with any other suitable wash system 20, such as a single, integrated wash system.

As illustrated, the wash module 24 generally includes a pump 54, and distribution manifold 56, and a plurality of wash lines 58. More specifically the pump 54 is configured to receive a flow of wash liquid and pressurize the flow of wash liquid. The pump 54 is configured to be releasably fluidly connected to an outlet 38 of a wash tank 36 of a wash tank module 22. For example, for the embodiment depicted, the wash module 24 includes a fluid connection line 60, with the fluid connection line 60 configured to be releasably fluidly connected to an outlet 38 of a wash tank 36 of a wash tank module 22. For example, when utilized with the exemplary wash tank module 22 of FIGS. 3 and 4, the fluid connection line of the wash module 24 may be releasably fluidly connected to the outlet 38 through quick release connection 40.

Although not depicted, the pump 54 may include a variable frequency drive motor, such that it may operate at various power levels. However, in other embodiments, any other suitable pump may be utilized, including any other suitable type of motor (such as a constant frequency motor). Additionally, as shown, the pump 54 is electrically connected to a power source 62, which may be a battery, or any other suitable power source. The power source 62 may provide the pump 54 with a necessary amount of electrical power to pressurize the wash liquid received to a desired pressure.

An outlet 64 of the pump 54 is fluidly connected to a duct 66 extending to the distribution manifold 56, such that the distribution manifold 56 is fluidly connected to the pump 54 for receiving a flow of pressurized wash liquid from the pump 54. For the embodiment depicted, upstream of the distribution manifold 56, the wash module 24 includes a sensor 68 for, e.g., sensing a temperature and or pressure, and a valve 70. The valve 70, for the embodiment depicted, is positioned in the duct 66 and movable between an open position allowing full flow of wash liquid through the duct 66 and a closed position, preventing any flow of wash liquid through the duct 66. In certain exemplary embodiments, the valve 70 may be a variable throughput valve movable between various positions between the open position and the closed position to allow a desired amount of wash liquid through the duct 66.

Referring still to FIGS. 5 and 6, for the embodiment depicted, the distribution manifold 56 is configured to receive a flow of wash liquid from the duct 66 (i.e., a flow of pressurized wash liquid from the pump 54), and distribute such flow of wash liquid to the plurality of wash lines 58. The distribution manifold 56 may be operably connected to a controller 72 of the wash module 24. Notably, the controller 72 may further be operably connected to various other components of the wash module 24. Specifically, for the embodiment depicted, the controller 72 is operably connected to the power source 62, the pump 54, the sensor 68, and the valve 70, in addition to the distribution manifold 56. The controller 72 may be configured similar to the computing device 32 of the control system 30, and may be in communication with the control system 30 of the wash system 20 through, e.g., a wireless communication network 34. For example, as will be described in greater detail below, the controller 72 may be configured to control a flow of pressurized wash liquid to the plurality of wash lines 58 through the distribution manifold 56.

Moreover, as is depicted, the plurality of wash lines 58 are fluidly connected to the distribution manifold 56 for receiving at least a portion of the pressurized wash liquid therefrom. Although for the embodiment depicted, the distribution manifold 56 is fluidly connected to four (4) wash lines 58, in other embodiments, the wash module 24 of the wash system 20 may instead include any other suitable number of wash lines 58 fluidly connected to the distribution manifold 56. As will be appreciated from the description below, the distribution manifold 56 may be configured, in certain embodiments, to distribute the flow of pressurized wash liquid in a fixed manner. For example, the distribution manifold 56 may be configured to split the flow of pressurized wash liquid substantially evenly between each of the plurality of wash lines 58 fluidly connected thereto. Additionally, or alternatively, the distribution manifold 56 may be configured to split the flow of pressurized wash liquid in an uneven manner between the plurality of wash lines 58 fluidly connected thereto (i.e., distributing more wash liquid to certain wash lines 58 than others). In still other exemplary embodiments, the distribution manifold 56 may be configured to vary a distribution of the flow of the pressurized wash liquid between the various wash lines 58 according to, e.g., individual spray schedules for the various wash lines 58.

Figure 7:
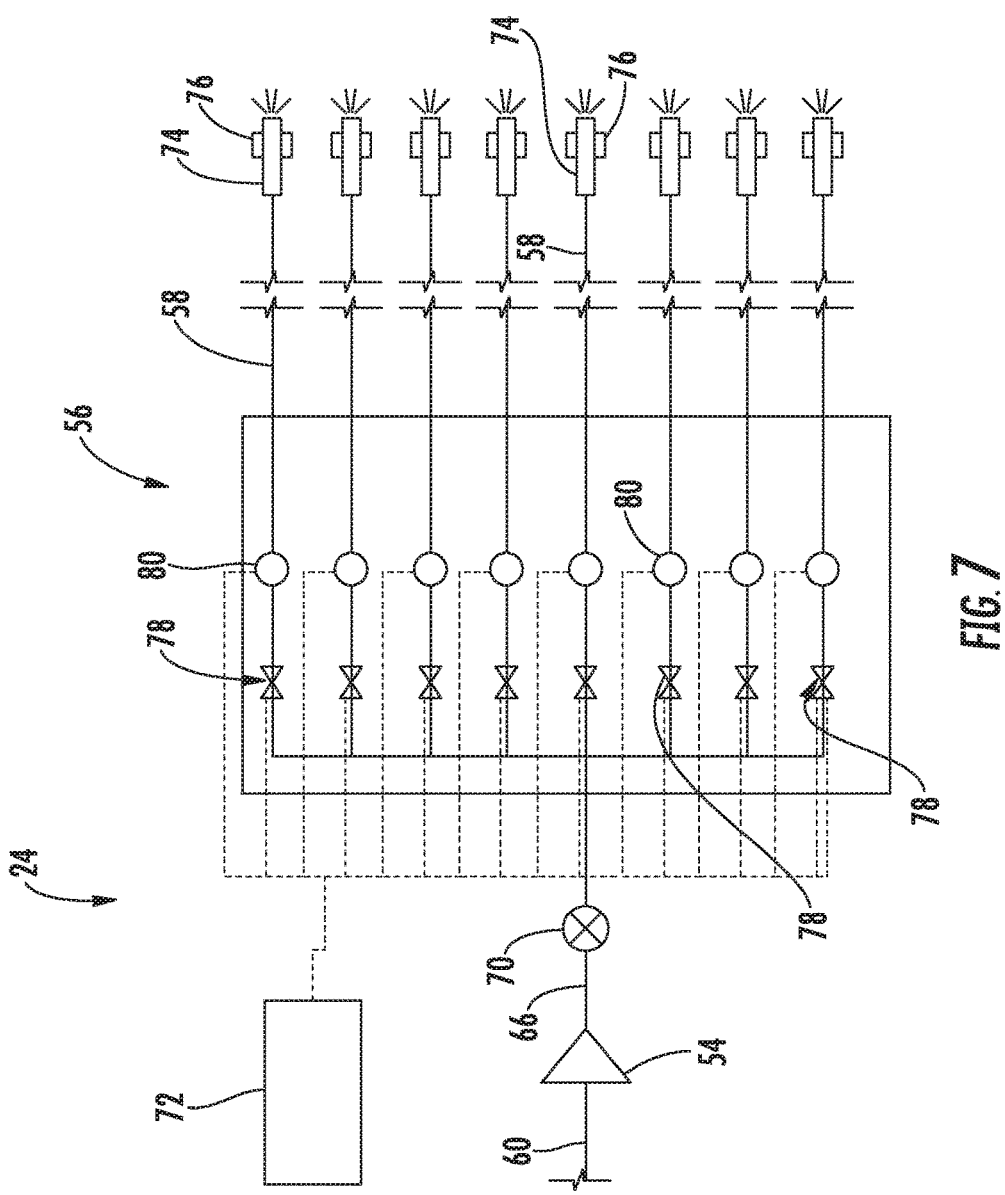
FIG. 7 is a schematic view of a distribution manifold in accordance with an exemplary embodiment of the present disclosure, as may be incorporated in the exemplary wash module of FIG. 6.

For example, referring now to FIG. 7, a wash system 20, or more particularly, a wash module 24 including a distribution manifold 56, in accordance with another exemplary embodiment of the present disclosure is depicted. As with the embodiment of FIG. 6, the exemplary distribution manifold 56 is fluidly connected to the pump 54 of the wash module 24 via a duct 66. Additionally, as is discussed in greater detail below, the wash module 24 further includes a plurality of spray nozzles 74, with each spray nozzle 74 attached to a respective wash line 58. Each of the plurality of spray nozzles 74 includes an attachment portion 76 for attachment to a respective borescope hole in a gas turbine engine, providing a substantially air-tight and water-tight connection to a borescope hole (see, e.g., borescope hole 146 in FIG. 8).

Furthermore, the exemplary distribution manifold 56 is configured to vary a distribution of the flow of pressurized wash liquid between the various wash lines 58. Specifically, the distribution manifold 56 includes a plurality of valves 78, with each of the plurality of valves 78 fluidly connecting a respective wash line 58 to the pump 54. Each of the valves 78 may be a variable throughput valve movable between a fully open position allowing complete flow of pressurized wash liquid therethrough, a fully closed position allowing no flow of pressurized liquid therethrough, as well as a variety of positions therebetween. For example, one or more of the variable throughput valves 78 may be configured as solenoid valves, or solenoid activated valves, or alternatively as ratio regulation valves.

Moreover, for the embodiment depicted each of the plurality of valves 78 is individually operably connected to the controller 72, such that the plurality of valves 78 are operable independently of one another. Accordingly, the controller 72 may control the plurality of valves 78 such that each operates according to its own unique flow schedule (e.g., flow rate, pressure, duration, etc.).

In addition to the plurality of valves 78, the distribution manifold 56 further includes a plurality of flow meters 80, wherein each flow meter 80 is in fluid communication with a wash line 58 of the plurality of wash lines 58 to measure a flowrate of the pressurized wash liquid flowing therethrough. More specifically, for the embodiment depicted, the distribution manifold 56 includes a flow meter 80 downstream from each of the valves 78, for measuring a flowrate of wash liquid flowing to (and through) each wash line 58. However, in other embodiments, one or more of the flow meters 80 may instead be positioned upstream of a respective valve 78, or at any other suitable location.

As with the plurality of valves 78, each of the flow meters 80 is operably connected to the controller 72, such that the controller 72 may receive information indicative of a flowrate of wash liquid through each wash line 58 from the respective flow meters 80. The controller 72 may utilize such information in controlling one or more of the plurality of valves 78. For example, the controller 72 may operate on a feedback loop to ensure wash liquid is flowing to and through a particular wash line 58 at a desired flow rate.

Figure 8:
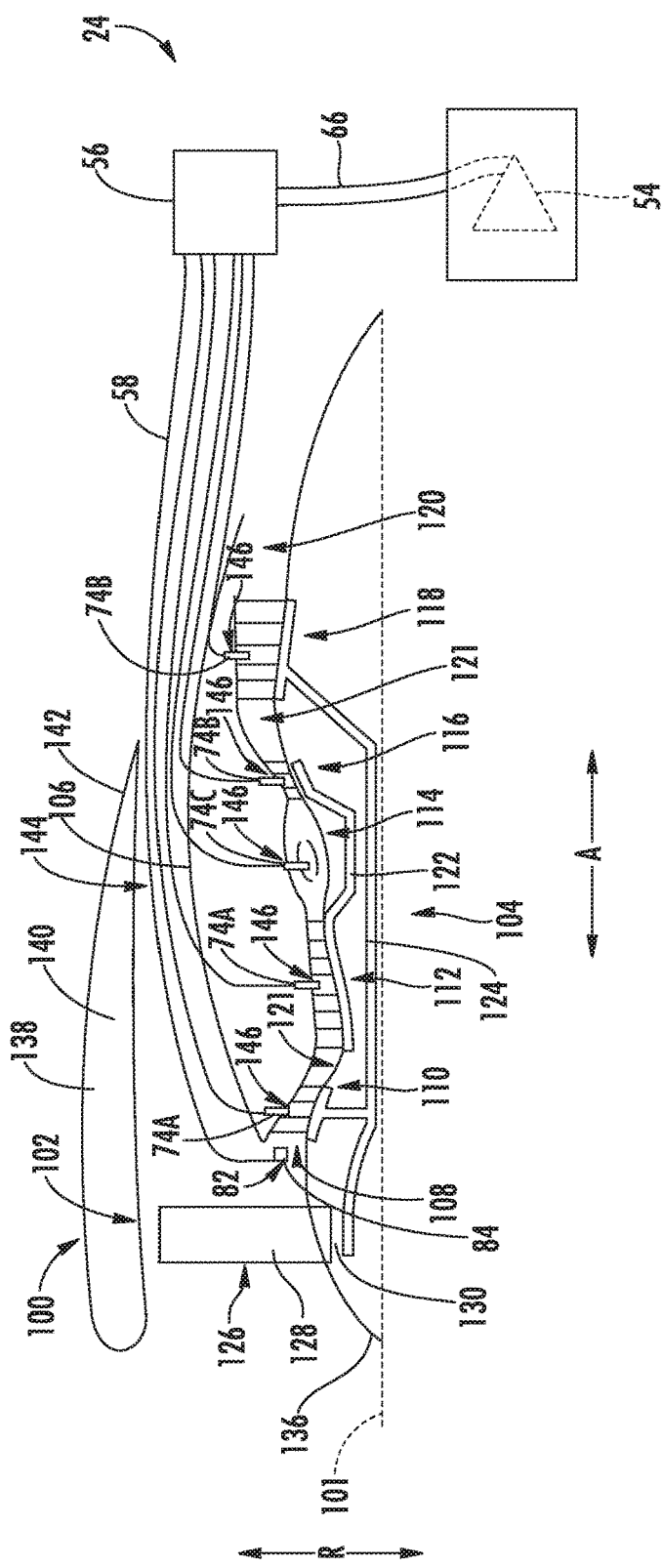
FIG. 8 is a schematic view of a wash module in accordance with an exemplary embodiment of the present disclosure, operable with a gas turbine engine in accordance with an exemplary embodiment of the present disclosure.

Referring now to FIG. 8, a schematic view of a wash module 24 of a wash system 20 in accordance with an exemplary embodiment of the present disclosure is depicted, being utilized in washing operations of a gas turbine engine. In certain exemplary embodiments, the wash module 24 of FIG. 8 may be configured in substantially the same manner as exemplary wash module 24 utilized in the exemplary wash system 20 of FIG. 1. For example, the exemplary wash module 24 generally includes a pump 54, a distribution manifold 56 fluidly connected to the pump 54 for receiving a flow of pressurized wash fluid therefrom, and a plurality of wash lines 58 fluidly connected to the distribution manifold 56.

As stated, the exemplary wash module 24 is being utilized in the embodiment depicted in FIG. 8 in washing operations of a gas turbine engine, also depicted schematically. The exemplary gas turbine engine depicted is configured as a high bypass turbofan engine, referred to herein as "turbofan 100." As is depicted, the exemplary turbofan 100 defines an axial direction A (extending parallel to a longitudinal centerline 101 provided for reference), a radial direction R, and a circumferential direction C (extending about the axial direction A). Additionally, the turbofan 100 includes a fan section 102 and a turbine engine 104 disposed downstream from the fan section 102. The exemplary turbine engine 104 depicted generally includes a substantially tubular outer casing 106 that defines an annular inlet 108. The outer casing 106 encases, in serial flow relationship, a compressor section including a second, booster or low pressure (LP) compressor 110 and a first, high pressure (HP) compressor 112; a combustor section 114; a turbine section including a first, high pressure (HP) turbine 116 and a second, low pressure (LP) turbine 118; and a jet exhaust nozzle section 120. The compressor section, combustor section 114, and turbine section together define a core air flowpath 121 extending from the annular inlet 108 through the LP compressor 110, HP compressor 112, combustor section 114, HP turbine section 116, LP turbine section 118 and jet nozzle exhaust section 120. A first, high pressure (HP) shaft or spool 122 drivingly connects the HP turbine 116 to the HP compressor 112. A second, low pressure (LP) shaft or spool 124 drivingly connects the LP turbine 118 to the LP compressor 110.

For the embodiment depicted, the fan section 102 includes a fan 126 having a plurality of fan blades 128 coupled to a disk 130 in a spaced apart manner. As depicted, the fan blades 128 extend outwardly from disk 130 generally along the radial direction R. In certain exemplary aspects, the fan 126 may be a variable pitch fan, such that each of the plurality of fan blades 128 are rotatable relative to the disk about a pitch axis, by virtue of the plurality of fan blades being operatively coupled to an actuation member.

Referring still to the exemplary embodiment of FIG. 8, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the turbine engine 104. The nacelle 138 is supported relative to the turbine engine 104 by a plurality of circumferentially-spaced outlet guide vanes 140. A downstream section 142 of the nacelle 138 extends over an outer portion of the turbine engine 104 so as to define a bypass airflow passage 144 therebetween.

Referring still to FIG. 8, the fan blades 128, disk 130, and front hub 136 are together rotatable about the longitudinal axis 101 directly by the LP spool 124. Accordingly, for the embodiment depicted, the turbofan engine 100 may be referred to as a "direct drive" turbofan engine. However, in other embodiments, the turbofan engine 100 may additionally include a reduction gearbox for driving the fan 126 at a reduced rotational speed relative to the LP spool 124.

Throughout the turbofan engine 100, the turbine engine 104 defines a plurality of borescope holes 146. Specifically, for the embodiment depicted, the turbine engine 104 includes one or more borescope holes 146 defined in the compressor section, in the combustor section 114, and in the turbine section. More specifically, still, for the embodiment depicted, the turbine engine 104 includes one or more borescope holes 146 defined in the LP compressor 110, the HP compressor 112, a combustion chamber of the combustor section 114, the HP turbine 116, and the LP turbine 118. The borescope holes 146 may allow for inspection of the turbine engine 104 between operations, and more specifically, may open into the core air flowpath 121 of the turbofan engine 100 to allow for inspection of, e.g., one or more blades, nozzles, or combustion liners of the turbofan engine 100 between operations. By contrast, during normal operations, the borescope holes 146 within the combustor section 114 and turbine section may be plugged with a borescope plug (not shown), such that the borescope holes 146 do not affect operation of the turbofan engine 100.

Moreover, as previously stated, the exemplary turbofan engine 100 is depicted schematically as being cleaned by the wash module 24 of the wash system 20. More specifically, the wash module 24 of the wash system 20 further includes a plurality of spray nozzles 74, each of the plurality of spray nozzles 74 attached to a respective wash line 58 and configured for extending at least partially into or through one of the borescope holes 146 of the turbofan engine 100 for providing at least a portion of the flow of the pressurized wash liquid to the turbofan engine 100. More specifically, the plurality of spray nozzles 74 may provide at least a portion of the flow of pressurized wash liquid directly to the core air flowpath 121 of the turbine engine 104, at a location downstream from the inlet 108. It should be appreciated, that in certain embodiments, the plurality of spray nozzles 74 may extend at least partially into or through borescope holes 146 of the turbofan engine 100 at locations spaced along, e.g., the circumferential direction C of the turbofan engine 100. Such a configuration may allow for a more even cleaning of the turbofan engine 100, or rather of the turbine engine 104, during such wash operations.

Referring still to FIG. 8, for the embodiment depicted, the plurality spray nozzles 74 includes a compressor spray nozzle 74A for extending at least partially into or through one of the borescope holes 146 defined in the compressor section of the turbofan engine 100, as well as a turbine spray nozzle 74B for extending at least partially into or through one of the borescope holes 146 defined in the turbine section of the turbofan engine 100. Further, for the embodiment depicted, the plurality spray nozzles 74 includes a combustor section spray nozzle 74C for extending at least partially into or through one of the borescope holes 146 defined in a combustion chamber of the combustor section 114 of the gas turbine engine.

More specifically, for the embodiment depicted, the compressor spray nozzle 74A includes a plurality of compressor spray nozzles 74A (a first plurality of spray nozzles 74 positioned within borescope holes 146 in a first region of the turbofan engine 100), with at least one spray nozzle 74A extending into or through a borescope hole 146 defined in the LP compressor 110 and at least one spray nozzle 74A extending into or through a borescope hole 146 defined in the HP compressor 112. Further, for the embodiment depicted, the turbine spray nozzle 74B includes a plurality of turbine spray nozzles 74B (a second plurality of spray nozzles 74 positioned within borescope holes 146 in a second region of the turbofan engine 100), with at least one spray nozzle 74B extending into or through a borescope hole 146 defined in the HP turbine 116 and at least one spray nozzle 74B extending into or through a borescope hole 146 defined in the LP turbine 118.

Additionally, the exemplary wash module 24 further includes an inlet nozzle assembly 82 fluidly connected to one or more of the plurality of wash lines 58 for providing at least a portion of the flow of pressurized wash liquid to the turbofan engine 100, or rather to the turbine engine 104, through the inlet 108 of the turbine engine 104. As is depicted, the inlet nozzle assembly 82 includes one or more inlet nozzles 84 positioned proximate the inlet 108 to the turbine engine 104 to spray wash liquid directly into and through the inlet 108 of the turbine engine 104. In other exemplary embodiments, however, the inlet nozzle assembly 82 may instead be located at least partially forward of the fan 126.

Referring still to FIG. 8, as noted above, the exemplary turbofan engine 100 includes the outer nacelle 138 which defines the bypass passage 144 with the turbine engine 104. For the embodiment depicted, the plurality of wash lines 58 extend from an aft end of the turbine engine 104, through the bypass passage 144 to each of the respective plurality of borescope holes 146, and to the inlet 108 for the inlet nozzle assembly 82. With such a configuration, the wash system 20 may operate without having to remove one or more portions of the fan section 102. More specifically, a wash system having such a configuration may allow for conducting washing operations (i.e., providing pressurized wash liquid through the plurality of wash lines and wash nozzles), while allowing for the turbofan engine to be cranked or rotated using, e.g., a starter motor or turning tool 172 (see FIG. 10), to increase in effectiveness of the washing operations. In addition, a controller, such as a system controller or controller 52, can automatically control the speed of the engine core rotation to improve cleaning performance or to prevent unwanted wash fluid intrusion into internal engine air circuits or other passageways. Moreover, such a controller can be configured for monitoring motor torque, e.g., to protect gearbox components.

Utilizing a wash system in accordance with one or more of the exemplary embodiments described herein may allow for more efficient cleaning of the gas turbine engine. More specifically, by providing a wash liquid directly to a core air flowpath of the turbine engine of the gas turbine engine may allow the wash system to provide such portions with heated and pressurized wash liquid. By contrast to prior configurations, in which wash liquid is provided solely at an inlet to the turbine engine (in which case such wash liquid may be neither pressurized nor heated by the time it reaches e.g., a turbine section), providing wash liquid directly to e.g., a turbine section of the turbine engine may allow the wash system to provide heated and pressurized wash liquid to such section. Additionally, embodiments including the individual valves fluidly connecting wash lines to a pump in a distribution manifold may allow for relatively precise cleaning of the gas turbine engine and/or targeted cleaning of a gas turbine engine. Moreover, the duration of the cleaning cycle may be adjusted, the density of the cleansing foam may be altered, and other adjustments to the cleaning cycle may be adjusted to improve cleaning efficiency.

Figure 9:
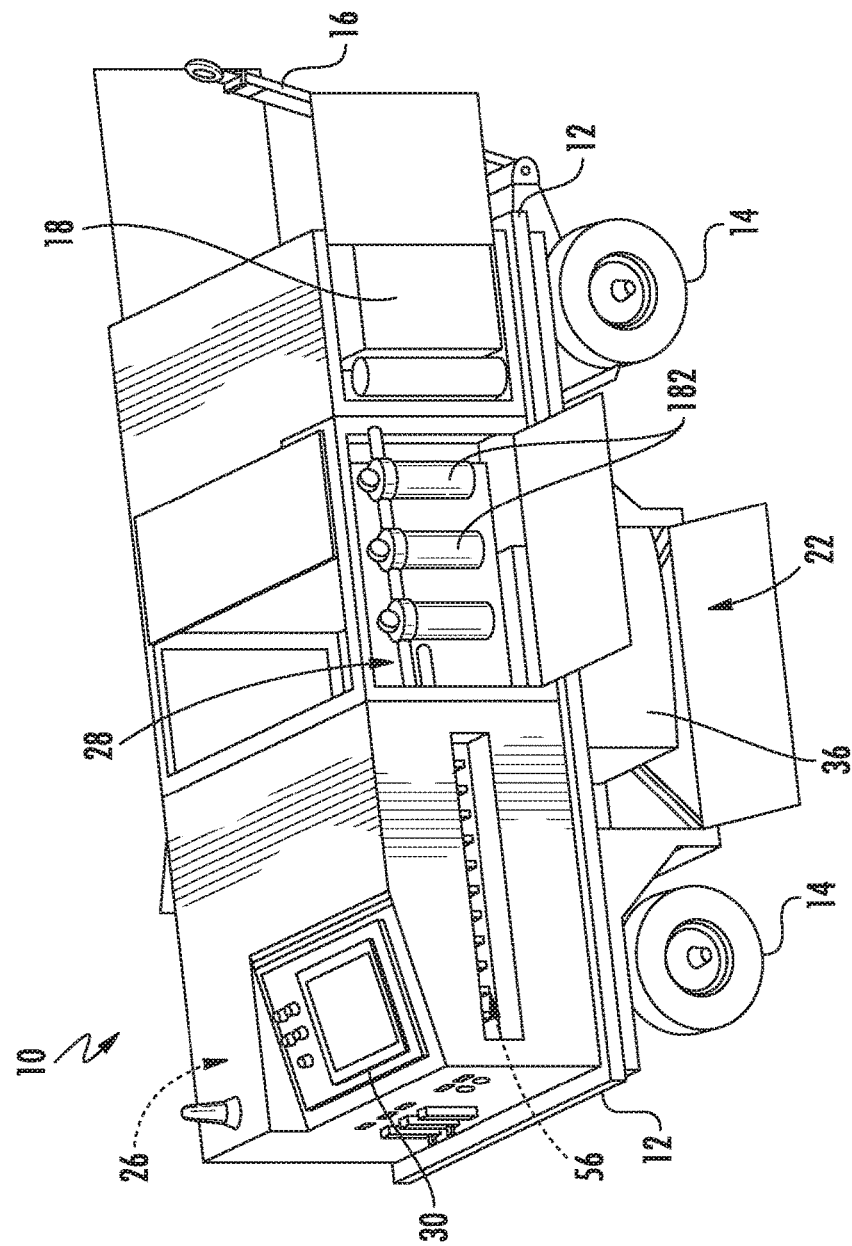
FIG. 9 provides a perspective view of the exemplary cart of FIG. 1 with several doors of the cart opened to reveal interior components.
Figure 10:
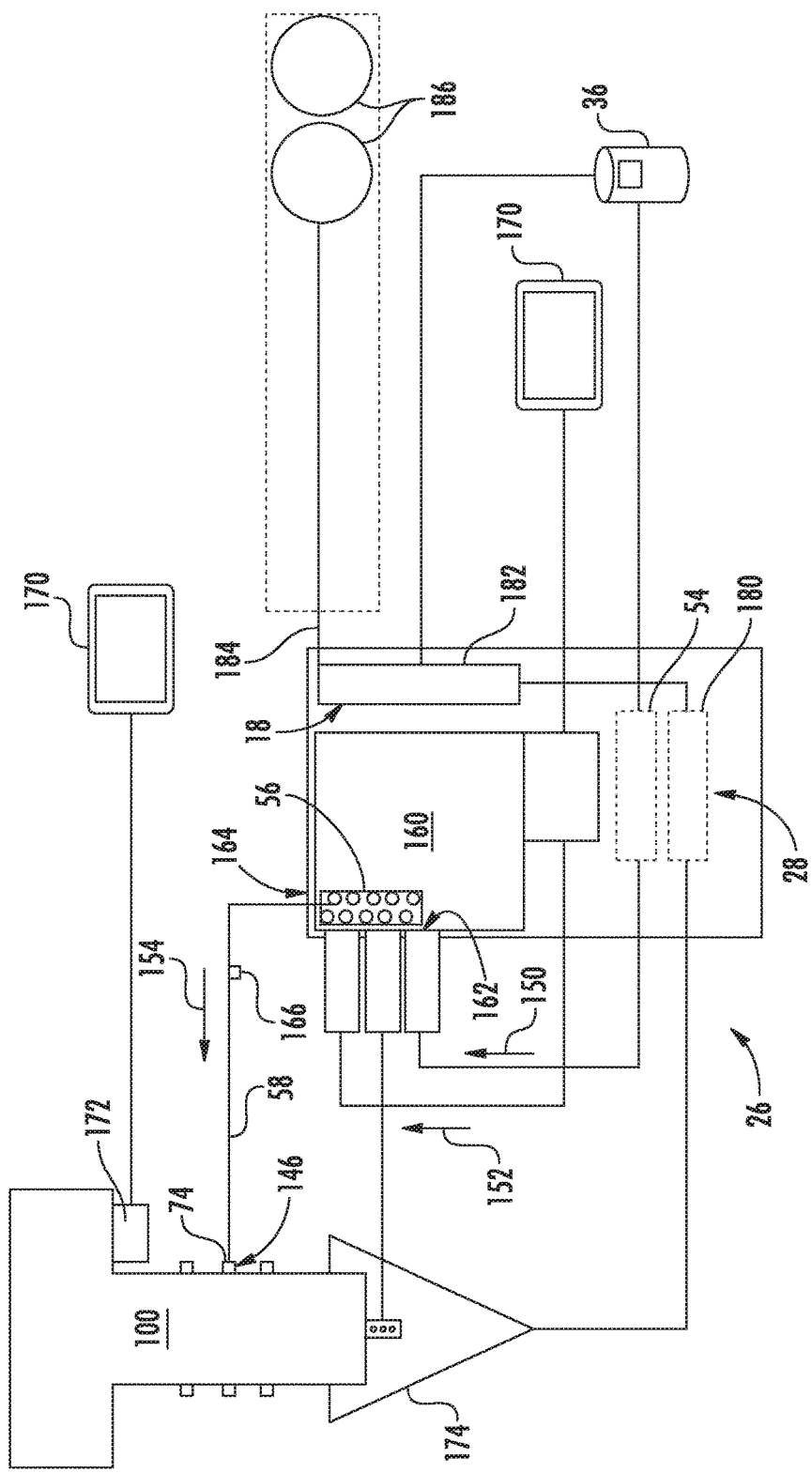
FIG. 10 is a schematic representation of various components of the exemplary wash system of FIG. 1, some or all of which may be housed within the exemplary cart of FIG. 1.

Referring now to FIGS. 9 and 10, collection module 28 will be described according to an exemplary embodiment of the present subject matter. More specifically, FIG. 9 provides a perspective view of collection module 28 as it may be contained within modular foam cart 10 according to an exemplary embodiment of the present subject matter. FIG. 10 provides a schematic view of wash system 20 including one exemplary configuration for collection module 28. It should be appreciated that collection module 28 as described with reference to FIGS. 9 and 10 may be utilized with wash system 20 or any other suitable wash system.

As illustrated in FIG. 10, a foam unit, such as foam wash module 26 is configured for receiving a flow of wash fluid (as indicated by arrow 150) from tank module 22, or more specifically, from tank 36. In addition, foam wash module 26 is configured for receiving a stream of air (as indicated by arrow 152) and for generating a flow of foamed wash fluid (as indicated by arrow 154). More specifically, foam wash module 26 includes a foam generating device 160 having an inlet manifold 162 and an outlet manifold 164. In this regard, a pump such as pump 54 of wash module 24 may urge the flow of wash fluid 150 from tank 36 through inlet manifold 162. Simultaneously, the stream of air 152 may be supplied to foam generating device 160 through inlet manifold 162, e.g., from an external pump or air compressor, from a centralized compressed air source (such as shop air 170), or from any other suitable source.

Foam generating device 160 is generally configured for mixing the flow of wash fluid 150 and the stream of air 152 to aerate the wash fluid and generate the flow of foamed wash fluid 154. In this regard, for example, the flow of foamed wash fluid 154 includes wash fluid with a desired foam density, or the ratio of air to fluid. The foam may be characterized according to different properties as well. For example, foam generating device 160 may be configured for achieving a specific bubble distribution, foam viscosity, etc. The foam characteristics may be manipulated by adjusting a temperature or a flow rate of either the flow of wash fluid 150 or the stream of air 152 into the foam generating device 160. Alternatively, mechanical means may be used to agitate the flow of wash fluid and generate more bubbles and thus lower foam density. For example, according to an exemplary embodiment, a foaming or aeration system may include three porous aeration devices through which the flow of wash fluid is passed. The porous aeration devices are fluidly coupled in series such that the flow of wash fluid passes successively through each aeration device and the bubble size is progressively refined and/or decreased. It should be appreciated that other aeration devices and configurations are possible and within the scope of the present subject matter.

The flow of foamed wash fluid 154 is then passed to the engine for cleaning, e.g., through wash lines 58 and spray nozzles 74 into borescope holes 146 of turbofan 100. According to the illustrated embodiment, outlet manifold 164 can include distribution manifold 56 for selectively distributing the flow of foamed wash fluid 154 through one or more of the plurality of wash lines 58 (only one wash line 58 is illustrated in FIG. 10 for clarity). However, according to alternative embodiments, distribution manifold 56 may be positioned at any suitable location downstream of foam generating device 160.

Wash system 20 may further include a foam sensing device 166 configured for measuring one or more of the foam characteristics described above. According to the illustrated embodiment, foam sensing device 166 is positioned downstream of outlet manifold 164. However, it should be appreciated that foam sensing device 166 may be positioned at any suitable location, e.g., proximate to or upstream of a distribution manifold 56. Foam sensing device 166 may be configured for measuring the volume and/or weight of the flow of foamed wash fluid 154 to determine its density, may include optical sensors for detecting air bubble size and distribution, or may measure foam characteristics in any other suitable manner.

The flow of foamed wash fluid 154 is supplied to turbofan engine 100 through outlet manifold 164. More specifically, the flow of foamed wash fluid 154 is selectively directed to one or more of the borescope holes 146 of turbofan engine 100, in a manner described above. Shop air 170 can be configured for operating an engine turning tool 172, for example, which rotates HP spool 122 and LP spool 124 to distribute the flow of foamed wash fluid 154 and assist with the cleaning process. An apron 174 may be used to collect foam and wash fluid after it passes from turbofan engine 100. According to the illustrated embodiment, apron 174 is a tarp that is positioned underneath turbofan engine. Apron 174 collects the used wash fluid which is returned to collection module 28 for discharge, filtering, and/or reuse. For example, as illustrated in FIG. 10, collection module 28 is positioned within modular foam cart 10, but collection module 28 could be stored separately.

According to the illustrated embodiment, collection module 28 includes a scavenge pump 180 configured for drawing waste fluid from apron 174 and urging it through one or more filters 182. Filters 182 may be configured for remove, dirt, grime, and other effluent from the waste fluid. After filters 182 remove such effluent, the wash fluid may pass back into turbofan engine 100 for additional cleaning or back into tank 36 for future reuse. In addition, as illustrated, a bypass line 184 may route waste water directly to one or more waste containers 186 (directly through or bypassing filters 182). It should be appreciated that FIG. 10 illustrates one exemplary configuration of modular foam cart 10 and wash system 20 for the purpose of explaining aspects of the present subject matter. It should be appreciated that variations and modifications may be made to such systems while remaining within the scope of the present subject matter.

Figure 11:
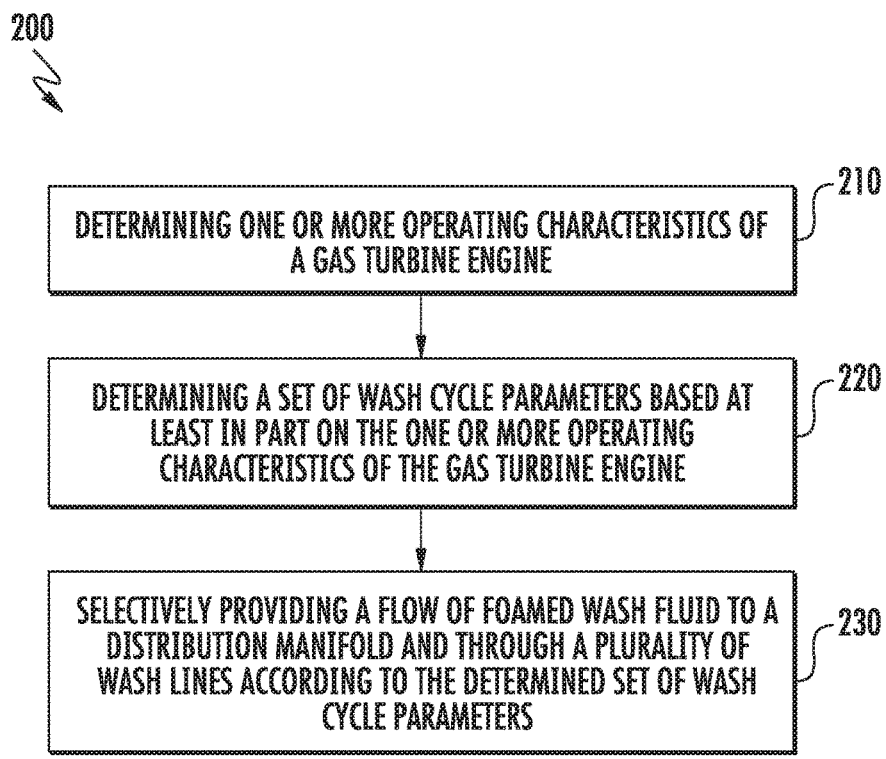
FIG. 11 provides a method of cleaning a gas turbine engine according to an exemplary embodiment of the present subject matter.

Referring now to FIG. 11, a method 200 for washing a turbine engine is provided according to an exemplary embodiment of the present subject matter. In at least certain exemplary aspects, the method 200 may be utilized with one or more of modular foam cart 10, wash system 20, and/or wash module 24 described above with reference to FIGS. 1 through 10. Moreover, in certain exemplary aspects, the method 200 may be utilized for washing a turbine engine configured in a manner similar to the exemplary turbofan 100 and turbine engine 104 described above with reference to e.g., FIG. 8. Accordingly, the turbine engine may include a compressor section, a combustor section, and a turbine section. Further, the turbine engine may define a plurality borescope holes located within one or more of the compressor section, combustor section, and turbine section.

Method 200 includes, at step 210, determining one or more operating characteristics of a gas turbine engine. According to one exemplary embodiment, the operating characteristics of the gas turbine engine may be determined using any suitable sensors, operator feedback, etc. Data indicative of such operating characteristics may be communicated to and from a control system of a wash system (such as wash system 20 of modular foam cart 10) to assist in determining an appropriate and/or optimal cleaning cycle/schedule for the gas turbine engine.

As using herein, "operating characteristics" of an engine include any data related the operation of the engine which may have an effect on its future operation or on the desired type or duration of cleaning needed. For example, the one or more operating characteristics of the gas turbine engine may include a model number of the gas turbine engine which may be used by a control system or a networked database for determining a desired schedule or type of cleaning based on prior data associated with similar engines.

In addition the operating characteristics may include information related to the operating conditions, statuses, faults, or other information specific to the operation of the engine being cleaned. For example, a flight history of the gas turbine engine, including the flight environment, contaminant exposure, flight altitude, and engine speeds may be useful in determining the most appropriate wash cycle parameters. In addition, the operating characteristics may include a cleaning history of the gas turbine engine which may be useful in determining the desired type and timing of a future cleaning. It should be appreciated that the exemplary operating characteristics described above are used only for explaining aspects of the present subject matter and are not intended to be limiting.

Method 200 further includes, at step 220, determining a set of wash cycle parameters based at least in part on the one or more operating characteristics of the gas turbine engine. As used herein, "wash cycle parameters" may refer to the type of wash cycle performed, the type of wash fluid used, or any other parameter that may be used to adjust the effectiveness of the wash cycle. For example, the wash cycle parameters may include a magnitude, a velocity, a pressure, a temperature, and a spray duration of the flow of foamed wash fluid. According to an exemplary embodiment, the wash cycle parameters may further include time delays during the wash cycle. For example, a wash cycle parameter may include a time delay after rinsing an engine with water or wash fluid, e.g., to let the water or wash fluid soak or saturate a region of the engine, to allow the detergent to break down dirt or grime, etc.

In this regard, for example, the operating characteristics determined above may be used by a control system, a human operator, an external database, or any other suitable source for determining the preferred method of cleaning the gas turbine engine. In this regard, for example, cleaning cycles may be tailored to the specific cleaning needs of the engine. For example, if the engine was cleaned recently and has limited contaminant build-up, a quick water wash may be the most efficient cleaning procedure to reduce cleaning time, detergent usage, energy usage, etc. By contrast, if the gas turbine engine is very soiled due to a particular type of contaminant exposure during a previous flight, a longer wash cycle directed to a particular portion of the engine using a foamed wash fluid having a particular density may be optimal.

As used herein, "foam quality characteristics" may include any quality of a flow of foamed wash fluid that may affect its cleaning ability in a particular situation. For example, foam quality characteristics may include the density of a flow of foamed wash fluid or its bubble variation and/or distribution. In addition, foam quality characteristics may include the ratio of liquid water to wash liquid mixed within a given flow of foamed wash fluid.

Method 200 further includes, at step 230, selectively providing a flow of foamed wash fluid to a distribution manifold and through a plurality of wash lines according to the determined set of wash cycle parameters. In this manner, the desired cleaning cycle may be performed on the gas turbine engine to address the particular conditions being experienced by the gas turbine engine. In this manner, cleaning efficiency is improved, engine downtime is reduced, and engine efficiency is optimized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A modular foam cart for washing a gas turbine engine, the modular foam cart comprising:
a detergent reservoir for storing wash fluid;
a pump configured for receiving a flow of wash fluid and pressurizing the flow of wash fluid;
a foam generating device in fluid communication with the pump, the foam generating device being configured for aerating the flow of wash fluid to generate a flow of foamed wash fluid;
a distribution manifold positioned within the modular cart and being in fluid communication with the foam generating device, the distribution manifold being configured for selectively directing the flow of foamed wash fluid through a plurality of wash lines;
a plurality of valves, each of the plurality fluidly connecting a respective one of the plurality of wash lines to the pump, wherein each of the plurality of valves is an independently controllable variable throughput valve, wherein each variable throughput valve is a valve that can be positioned at a fully closed position that corresponds to a flow rate of zero, fully open position that corresponds to a maximum flow rate, or any of a number of intermediary positions that each correspond to a flow rate that is greater than zero but less than the maximum flow rate; and
a programmed controller in operative communication with the foam generating device and the plurality of valves wherein the controller is configured to:
determine one or more operating characteristics of the gas turbine engine;
automatically determine a set of wash cycle parameters based at least in part on the one or more operating characteristics of the gas turbine engine;
selectively provide the flow of wash fluid to the distribution manifold; and
selectively regulate the plurality of valves to provide a portion of the flow of wash fluid to at least two of the plurality of wash lines, wherein the plurality of valves are independently regulated to provide different flow rates according to the determined set of wash cycle parameters.

2. The modular foam cart of claim 1, wherein the set of wash cycle parameters includes a density of the flow of foamed wash fluid.

3. The modular foam cart of claim 1, wherein the set of wash cycle parameters includes a temperature or a flow rate of either the flow of wash fluid or a flow of air into the foam generating device.

4. The modular foam cart of claim 1, further comprising a foam quality sensor positioned within the flow of foamed wash fluid proximate the distribution manifold.

5. The modular foam cart of claim 1, wherein the gas turbine engine comprises a plurality of borescope holes and the plurality of wash lines provide fluid communication between the distribution manifold and the plurality of borescope holes for selectively providing a portion of the flow of foamed wash fluid to the gas turbine engine.

6. The modular foam cart of claim 1, wherein each of the plurality of valves are operable independent of one another to simultaneously provide a first flow of foam through a first wash line according to a first spray schedule and a second flow of foam through a second wash line according to a second spray schedule, wherein the first spray schedule is different than the second spray schedule.

7. The modular foam cart of claim 6, wherein the first spray schedule includes at least one of a magnitude, a velocity, a pressure, a temperature, a spray duration, or a time delay associated with the application of the first flow of foam, and wherein the second spray schedule includes at least one of a magnitude, a velocity, a pressure of, a temperature, a spray duration, or a time delay associated with the application of the second flow of foam.

8. The modular foam cart of claim 1, wherein the one or more operating characteristics of the gas turbine engine comprise a model number of the gas turbine engine, a cleaning history of the gas turbine engine, and a flight history of the gas turbine engine, including a flight environment, contaminant exposure, flight altitude, and engine speeds.

9. A wash system for washing a gas turbine engine, the gas turbine engine comprising a compressor section, a combustor section, and a turbine section, the turbine engine defining a plurality of borescope holes located within one or more of the compressor section, the combustor section, and the turbine section, the gas turbine engine further comprising one or more inlet nozzles positioned proximate an engine inlet, the wash system comprising:
a detergent reservoir for storing wash fluid;
a distribution manifold providing selective fluid communication between the detergent reservoir and a plurality of wash lines fluidly coupled to the plurality of borescope holes and the inlet nozzles;

a pump configured for urging a flow of wash fluid from the detergent reservoir through the distribution manifold and at least one of the plurality of wash lines;

a foam generating device in fluid communication with the pump, the foam generating device being configured for aerating the flow of wash fluid to generate a flow of foamed wash fluid;

a plurality of valves, each of the plurality of valves fluidly connecting a respective one of the plurality of wash lines to the pump, wherein each of the plurality of valves is an independently controllable variable throughput valve, and wherein each variable throughput valve is a valve that can be positioned at a fully closed position that corresponds to a flow rate of zero, a fully open position that corresponds to a maximum flow rate, or any of a number of intermediary positions that each correspond to a flow rate that is greater than zero but less than the maximum flow rate; and a programmed controller in operative communication with the distribution manifold and the plurality of valves, the controller being configured to:

determine one or more operating characteristics of the gas turbine engine;

automatically determine a set of wash cycle parameters based at least in part on the one or more operating characteristics of the gas turbine engine, wherein the set of wash cycle parameters includes one or more foam quality characteristics of the flow of foamed wash fluid;

selectively provide the flow of wash fluid to the distribution manifold; and selectively regulate the plurality of valves to provide a portion of the flow of wash fluid to at least two of the plurality of wash lines, wherein the plurality of valves are independently regulated to provide different flow rates according to the determined set of wash cycle parameters.

10. The wash system of claim 9, wherein the set of wash cycle parameters includes at least one of a magnitude, a velocity, a pressure, a temperature, a spray duration, or a time delay associated with the application of the flow of foamed wash fluid.

11. The wash system of claim 9, wherein the one or more operating characteristics of the gas turbine engine comprise a model number of the gas turbine engine, a cleaning history of the gas turbine engine, and a flight history of the gas turbine engine, including a flight environment, contaminant exposure, flight altitude, and engine speeds.

12. The modular foam cart of claim 1, further comprising a collection module comprising:

an apron positioned proximate the gas turbine engine for collecting used wash fluid;

a scavenge pump fluidly coupled to the apron for urging a flow of used wash fluid; and one or more filters for removing contaminants from the flow of used wash fluid.

13. The modular foam cart of claim 12, wherein the flow of used wash fluid is recirculated through the gas turbine engine or passed back into the detergent reservoir for future reuse.

14. The modular foam cart of claim 12, wherein the collection module comprises:

one or more waste containers; and a bypass line providing fluid communication between the one or more filters and the one or more waste containers, wherein the flow of used wash fluid is directed to the one or more waste containers.

15. The modular foam cart of claim 1, comprising:

a plurality of flow meters, each of the plurality of flow meters being operably coupled to a respective one of the plurality of wash lines and the controller, the controller being configured for regulating the plurality of valves based on feedback from the plurality of flow meters.

* * * * *